United States Patent [19]

Lamel et al.

[11] 4,001,773
[45] Jan. 4, 1977

[54] ACOUSTIC TELEMETRY SYSTEM FOR OIL WELLS UTILIZING SELF GENERATED NOISE

[75] Inventors: Arthur E. Lamel, Arcadia; William D. Squire; Harper J. Whitehouse, both of San Diego, all of Calif.

[73] Assignee: American Petroscience Corporation, Bakersfield, Calif.

[22] Filed: July 28, 1975

[21] Appl. No.: 599,836

Related U.S. Application Data

[60] Continuation-in-part of Ser. No. 396,403, Sept. 12, 1973, Pat. No. 3,906,434, which is a division of Ser. No. 113,147, Feb. 8, 1971, Pat. No. 3,790,930.

[52] U.S. Cl. .................. 340/18 LD; 340/18 NC; 181/106; 175/40
[51] Int. Cl.² .................. G01V 1/02; G01V 1/40
[58] Field of Search ............ 340/15.5 SW, 18 LD, 340/18 NC; 181/106, 139; 175/40, 50; 166/113

[56] References Cited

UNITED STATES PATENTS

| | | | |
|---|---|---|---|
| 2,810,546 | 10/1957 | Eaton et al. | 340/18 LD |
| 3,281,773 | 10/1966 | Newman | 340/15.5 SW |
| 3,520,375 | 7/1970 | Raynal et al. | 175/40 |
| 3,588,804 | 6/1971 | Fort | 340/18 Nc |
| 3,813,656 | 5/1974 | Fowler | 340/18 NC |

OTHER PUBLICATIONS

Barnes et al., "Passbands for Acoustic . . . Drill Strings", 1972, pp. 1606–1608, J.A.S.A., vol. 51, No. 5.
Smith, "Dyna–Drill Handbook, " pp. 1–88, 1971.
Mosar, "Physical Acoustics and Properties of Solids", 1958, pp. 136–137, Pub. by Van Nostrand Co.

*Primary Examiner*—Nelson Moskowitz
*Attorney, Agent, or Firm*—Forrest J. Lilly

[57] ABSTRACT

An acoustic communication method and system are disclosed for transmitting information through a wellbore drill string by using the acoustic noise inherently generated in the drill string by drilling operations as a "carrier" propagated therealong to be modulated by the information to be transmitted. In the drilling of wells, the action of the drill tool on the bottom of the bore hole creates acoustic noise within the drill string. Other suitable sources of "noise" are often present during "drilling operations", as broadly defined, even while bore drilling, as such, is suspended. This noise usually consists both of wide-band continuous acoustic energy and of narrow spectral lines of acoustic energy and is usually present in a variety of acoustic modes such as longitudinal and torsional acoustic waves. The detailed characteristic of this acoustic noise depends on the type of drill tool used, the drilling speed and the type of formation being drilled.

When this inherently generated noise is modulated by an information containing signal at a signal-transmitting station, acoustic communication of information is possible while drilling is in progress, or, in some cases, while drilling as such is suspended. The communication occurs between the transmitting station and a signal-receiving station spaced along the drill string, using the intervening length of drill string between the signal-transmitting and signal-receiving stations as an acoustic transmission channel.

20 Claims, 17 Drawing Figures

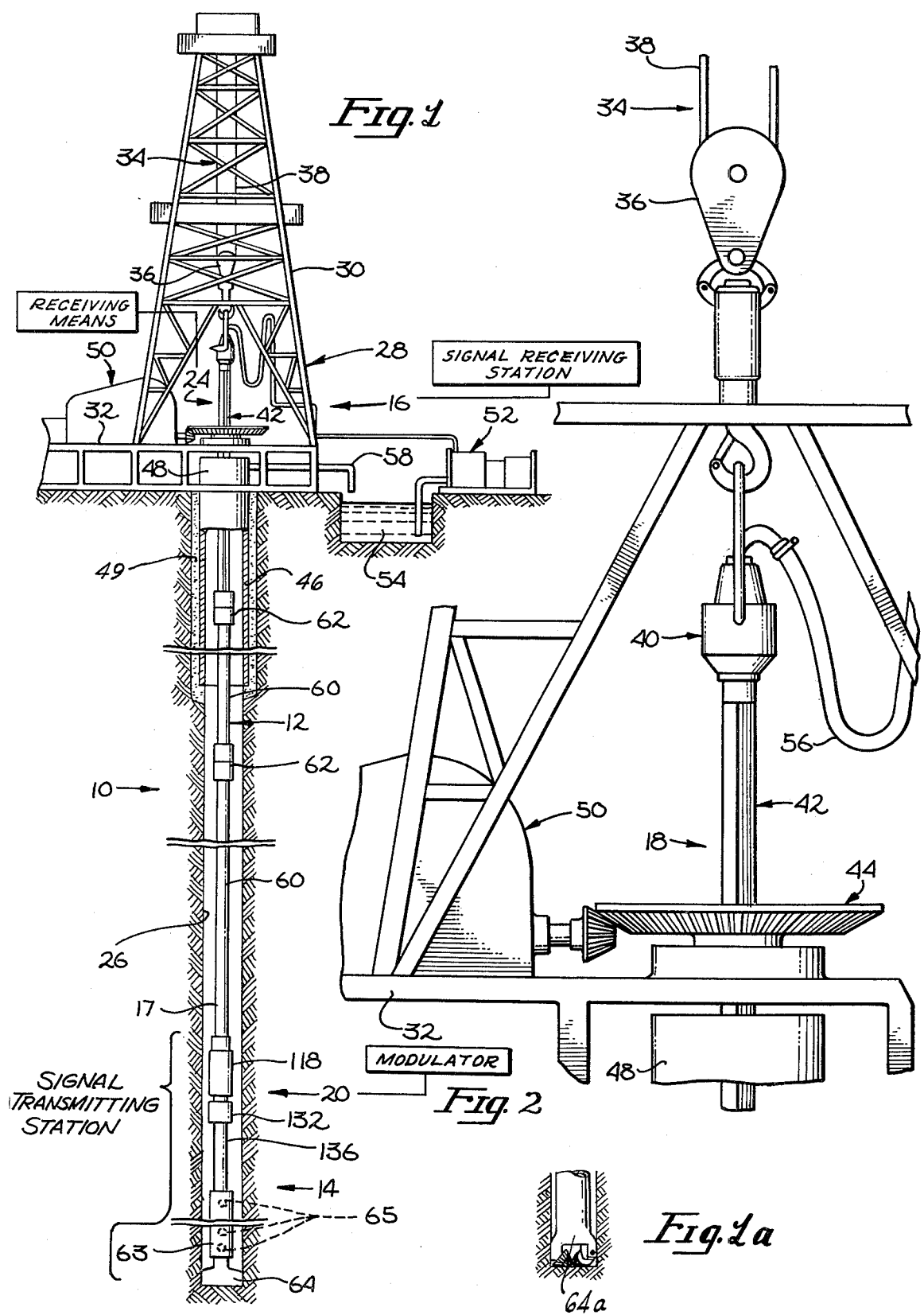

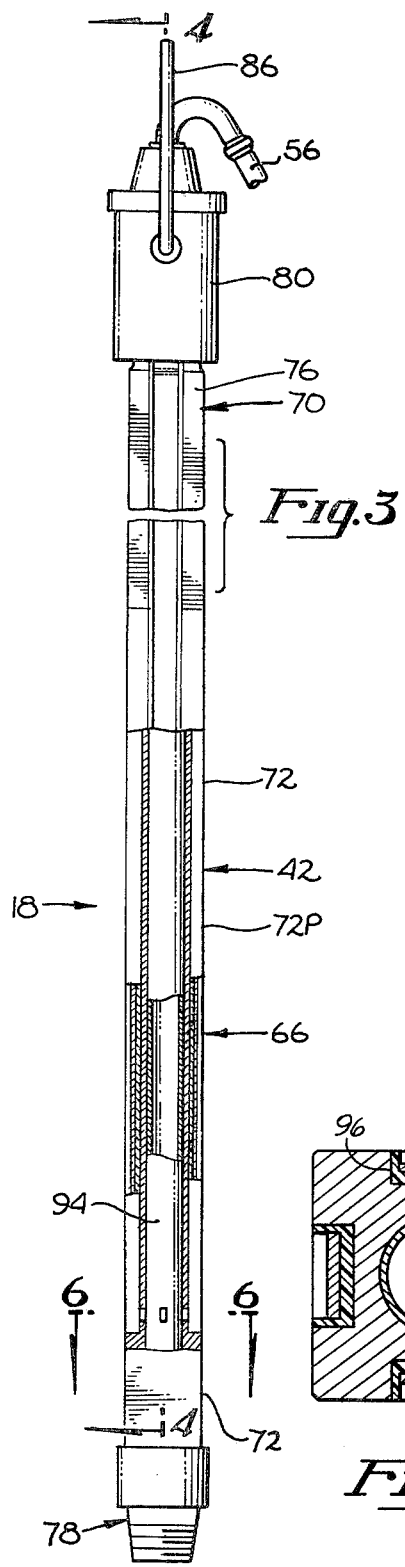
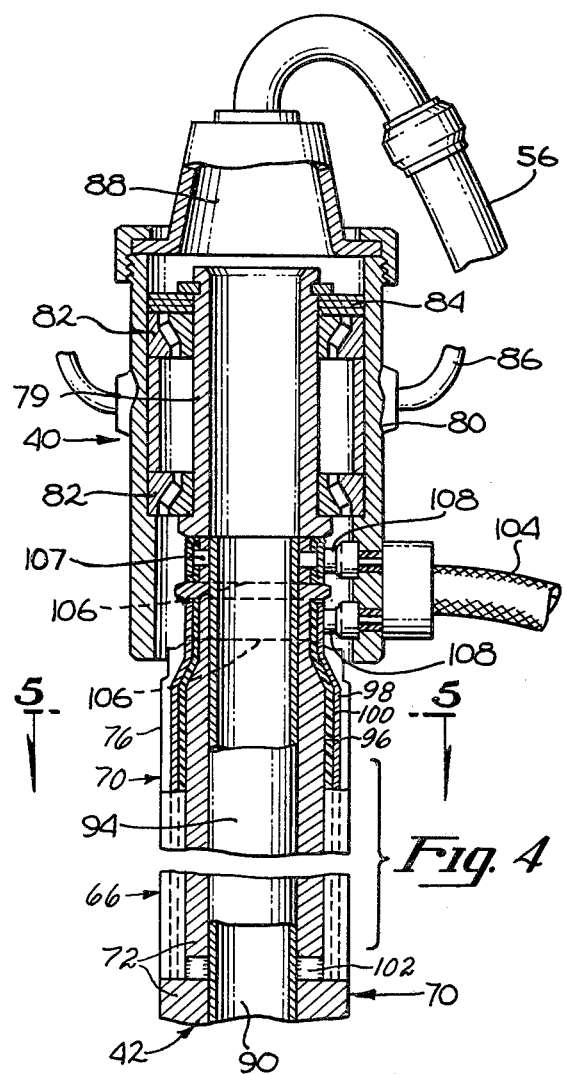
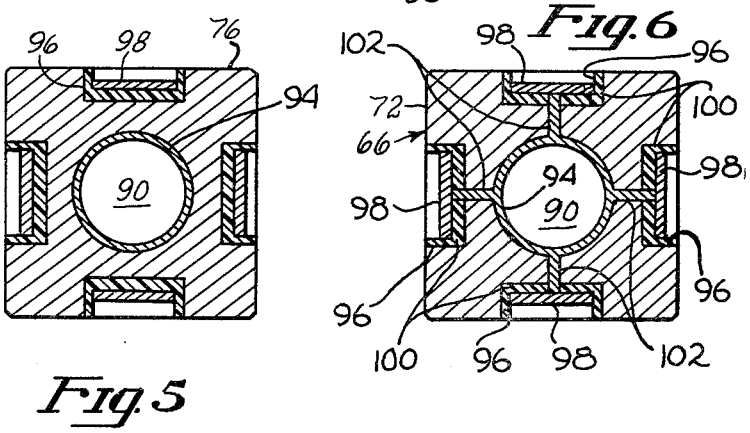

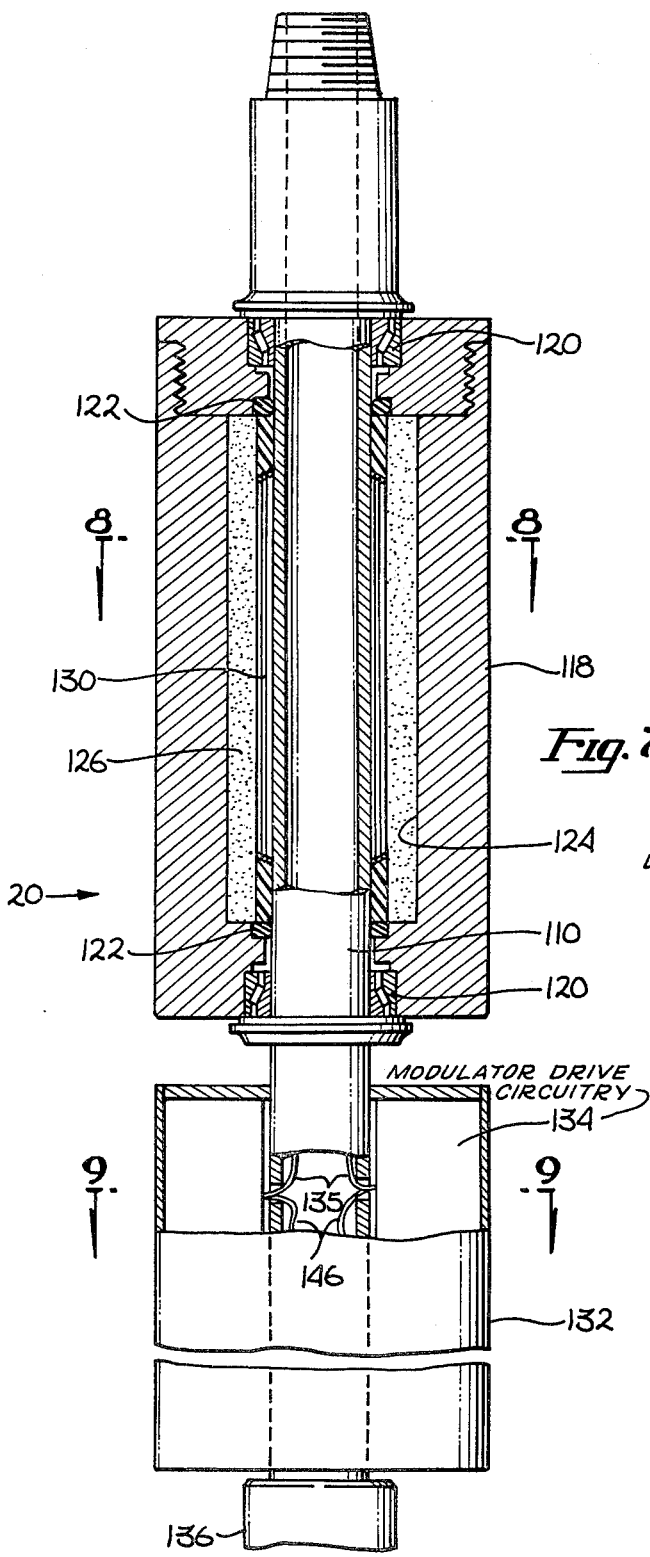
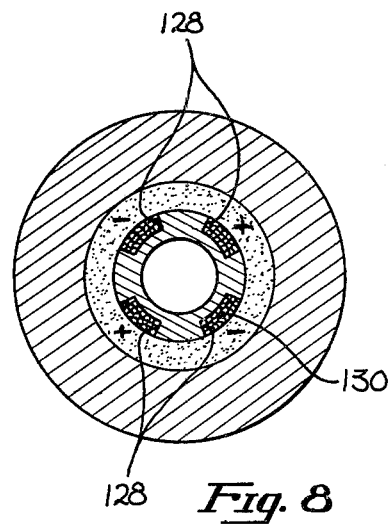
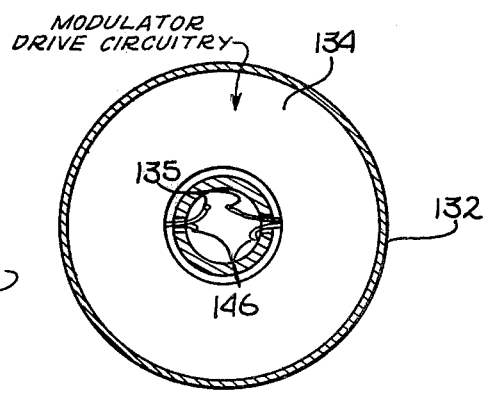

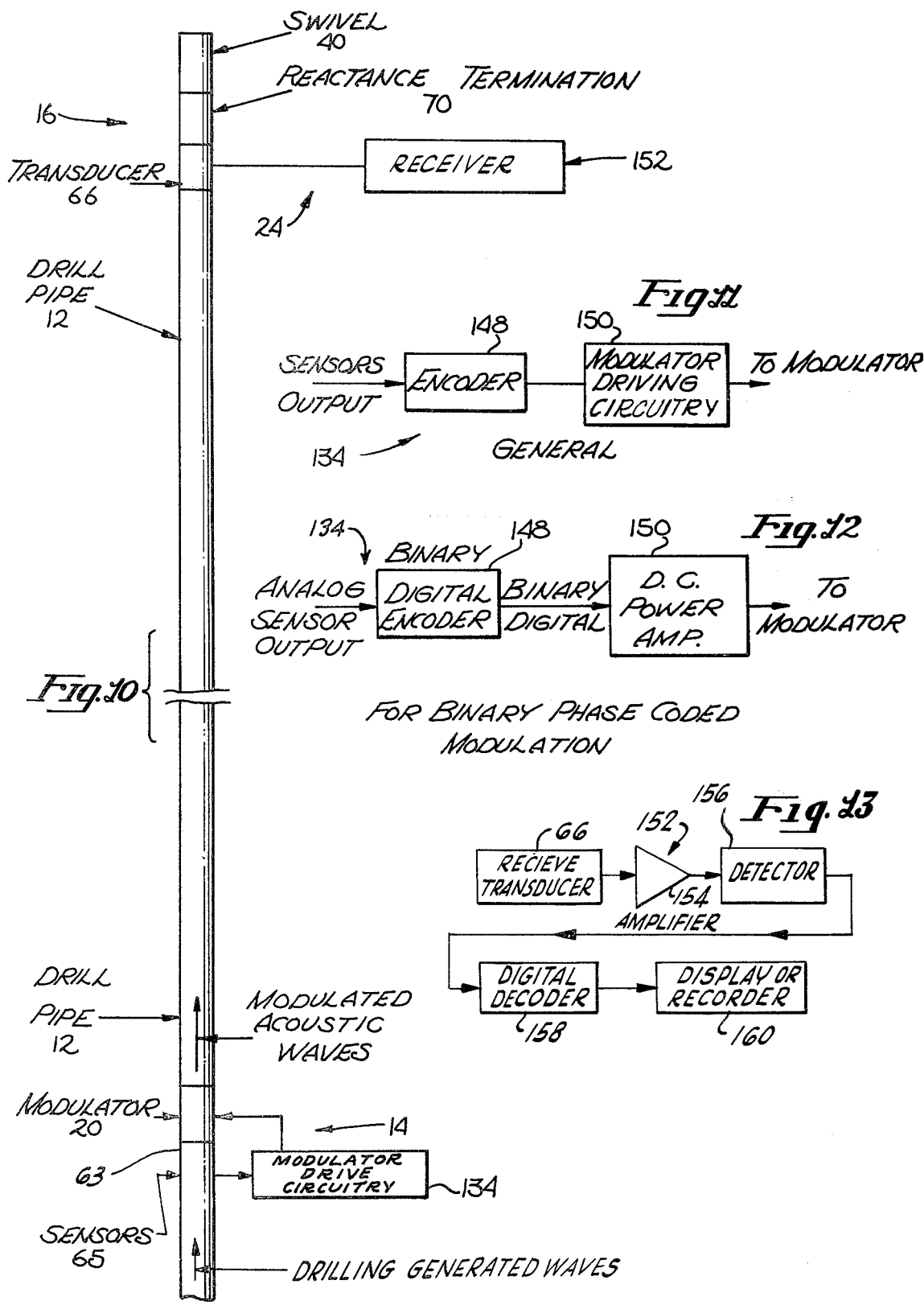

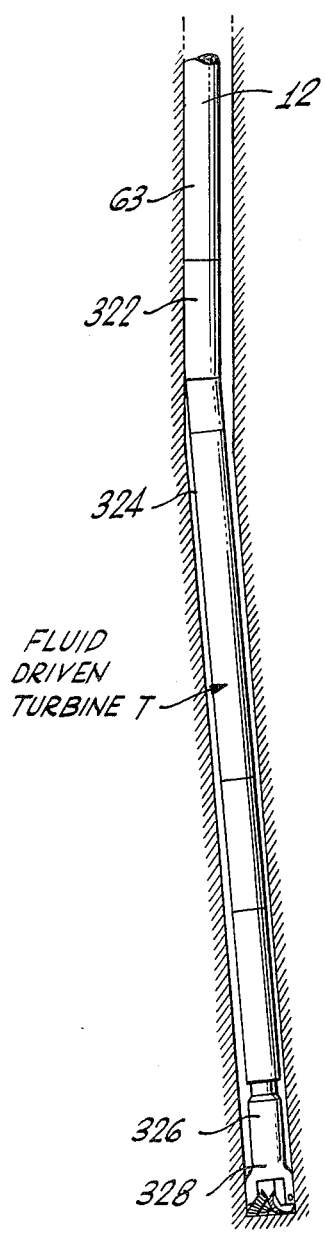
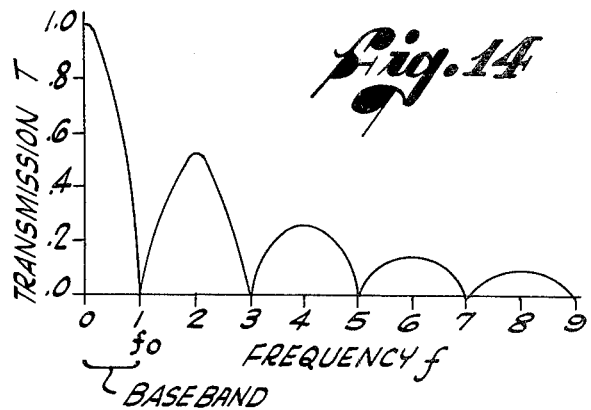
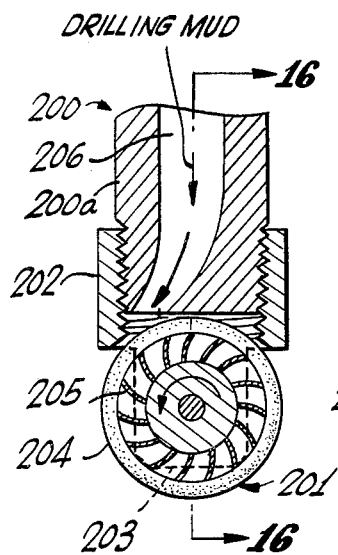
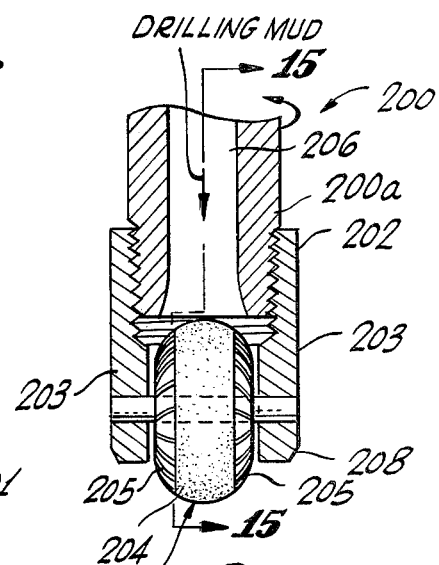

ACOUSTIC TELEMETRY SYSTEM FOR OIL WELLS UTILIZING SELF GENERATED NOISE

RELATED APPLICATION

This application is a continuation-in-part of our earlier application Ser. No. 396,403, filed Sept. 12, 1973, now U.S. Pat. No. 3,906,434, which was in turn a division of our parent application, Ser. No. 113,147, filed Feb. 8, 1971, now U.S. Pat. No. 3,790,930.

BACKGROUND OF THE INVENTION

1. Field of the Invention

This invention relates generally to the art of transmitting telemetric and control information through a hollow well bore, drill string or other pipe. More particularly, the invention relates to an improved acoustic communication method and system for the purpose described wherein the information carrier is provided by acoustic noise generated by the drill system during drilling operations, preferably torsional waves of zero order inherently generated in the drill string by virtue of drilling operations.

2. Description of the Prior Art

As will appear from the ensuing description, the present acoustic communication method and system may be employed to transmit information, during and by virtue of drilling operations, between two points of a drill pipe having an intervening length capable of sustaining acoustic waves, particularly torsional waves of zero order. However, the principal application of the invention involves transmission of telemetric and control information through a hollow drill string suspended within a well bore. Accordingly, the invention will be disclosed in connection with this particular application.

When drilling a well bore, it is desirable, if not essential, to monitor selected drilling parameters in the vicinity of the drill bit for the purpose of providing the drilling operator with sufficient information to properly control the drilling operation. Among the drilling parameters which provide valuable information to the drilling operation are temperature, formation pressure, formation porosity, and others. See our parent U.S. Pat. No. 3,790,930. In slant drilling operations, such as off-shore drilling of multiple wells from a single platform or island, an additional drilling parameter which provides extremely valuable if not essential information to the drilling operator is drill string orientation.

Such drill string orientation is expressed in terms of the azimuth and pitch or inclination of the lower end of the string and must be accurately measured at frequent intervals during the drilling operation in order to maintain the proper slant drilling direction.

At the present time the most widely used method of measuring drill string orientation involves the use of a well log which is lowered on a cable through the hollow drill string to the bottom of the well bore. This log contains instruments, such as a compass and a spirit level or pendulum, for sensing drill string azimuth and inclination and a camera for photographically recording the instrument readings. After actuation of the camera to record these instrument readings, the log is withdrawn from the drill string and the film is developed to obtain the readings. While this method provides accurate information concerning drill string orientation, it is extremely time-consuming and substantially increases the total drilling cost. Thus, each well logging operation involves cessation of drilling, uncoupling the drilling kelly from the drill string, lowering and subsequently raising the log the whole length of the drill string, recoupling the kelly to the drill string, and resumption of drilling. In many offshore drilling operations, periodic logging of the well bore in this fashion may account for up to one-half the total drilling operation time and hence for a large portion of the total drilling operation cost.

The present invention proposes to avoid the above and other disadvantages of the described well logging technique and to improve on the existing techniques for monitoring other drilling parameters by providing a novel and improved acoustic communication method and system for transmitting telemetric and control information through a drill string during drilling operations, as broadly defined hereinafter.

The prior art relating to well drilling is replete with a vast assortment of acoustic communication techniques for transmitting information through a drill string. Simply stated, such communication techniques involve propagation through the drill string from one position of station to another of modulated acoustic waves containing the information to be transmitted, and demodulation of the modulated waves at another position or station along the drill string to recover the transmitted information. In the present disclosure, the station from which the modulated acoustic waves propagate is referred to as a signal-transmitting station. The position at which the modulated waves are demodulated to recover the transmitted information is referred to as a signal-receiving station.

The prior acoustic communication systems for transmitting information through a drill string are deficient in that they utilize relatively inefficient modes of acoustic wave propagation and thus achieve, at best, only marginal information transmission. In this regard, it is significant to note that most published patents in the field use such descriptors as vibrations, sound, acoustic waves, and the like, to describe the acoustic information carrier, and do not specifically define the exact mode of acoustic wave propagation. For the most part, those patents which do describe a specific form a acoustic wave propagation utilize either longitudinal or flexural vibration modes. These latter vibration modes, however, are ill-suited for use in transmitting information through a drill string of great length owing to the large transmission losses which occur as a result of acoustic coupling of the drill string to the drilling fluid and the wall of the well bore.

Furthermore, this prior manner of operation has required installation of an acoustic wave transducer and its electronic driving circuitry within the lower end of the drill string. Thus, a large source of power to drive the transducer was required at the lower end of the drill string.

SUMMARY OF THE INVENTION

The present invention provides an improved acoustic communication method and system of the class described whose primary application involves transmission of telemetric information through a drill string suspended within a well bore from a surface drilling platform. According to the invention, acoustic waves inherently produced in the drill string by virtue of drilling operations, are modulated at a signal-transmitting station by exciting an accoustic wave modulator in the drill string with a modulating signal representing the information to be transmitted.

Telemetric signals transmitted through the drill string may represent selected drilling parameters in the vicinity of the drill bit, such as temperature, formation pressure, formation porosity, drill string orientation, and others. In this case, modulation with telemetric signals from sensors responsive to the selected drilling parameters to be monitored occurs at a subsurface signal-transmitting station adjacent to the lower end of the drill string. Also, control signals transmitted through the drill string may be utilized to operate or activate devices located along the drill string, such as a modulator in the vicinity of the drill bit or a blowout preventer in the vicinity of the drilling platform.

In its broadest scope, the invention contemplates the use of any acoustic waves self-generated by the drill system during drilling operations, imparted to or established in the drill string, which will propagate therealong, and which may be modulated to transmit information through the string. In the present disclosure, the term drilling operations includes all operations or activities that take place at the drilling site in connection with drilling a well, including, but not restricted to, the actual act of turning the drill string to cause a rotary drill bit to drill into the formation and including pumping the drilling mud, operating the draw works, the generation of electric power, the running of machinery, all other activities connected with operating a drilling site. Also, in the present disclosure, all acoustic waves that are imparted to or generated in the drill string during such operations, such as but not limited to, torsional acoustic waves generated in the drill string by a rotary drill bit grinding on the bore hole bottom or longitudinal acoustic waves generated in the drill string by a mud turbine drilling wheel grinding on the bore hole bottom or the torsional waves generated in the drill string by the turning of a sprocketed or geared drilling turntable, are contemplated as possible acoustic waves to be modulated at the transmitting station for the transmission of information.

However, the preferred waves generated in the drill string are torsional acoustic waves of zero order, that is, torsional acoustic waves characterized by pure rotation of the drill string about its central axis. Such zero order torsional waves are non-dispersive, i.e., the velocity of the waves is independent of their frequency, while most other acoustic wave forms are dispersive. Non-dispersive wave propagation through a drill string is highly desirable, and often essential to rapid signal transmission through the string for the reason that dispersion smears the information signals modulated on the waves. Such torsional waves, which appear as natural components of the acoustic noise generated by the drill string during usual drilling operations, also couple less acoustic energy into the drilling fluid and wall of the well bore than do longitudinal or flexural waves and thus permit efficient signal transmission through a greater length of drill string.

An important aspect of the generic invention is concerned with the actual generation of the acoustic waves within the drill string. The method involves utilization of acoustic waves which are inherently produced in a drill string during drilling operations. Such acoustic waves, in the preferred embodiment employing rotary drilling, are composed of relatively broad-band components and narrow spectral lines or frequency bands, such as may be generated by the teeth of a cutting bit, such as a toothed cone bit, the gears in the mechanical drill string drive, or by other devices involved in the rotary drilling operation.

It is well-known that a drill string cutting bit, in the process of cutting into an earth formation, generates large quantities of noise which are transmitted along the drill string. Since the cutting motion, in rotary drilling, is primarily a turning or twisting motion, a large component of this noise is torsional in character, i.e., consists of torsional acoustic waves.

The noise generated by the drilling bit in its drilling action on the rock includes acoustic waves that are suitable for transmission from the vicinity of the drill bit of either telemetry data to be monitored at the top side receiving station, or control signals to control devices at the top side receiving station.

The noise generated by the drill string drive mechanism at the top side, on the other hand, includes acoustic waves that are suitable for the transmission of information down the drill string such as control signals to control devices at the well bottom (see our issued U.S. Pat. Nos. 3,790,930 and 3,906,434 and issued U.S. Pat. No. 3,790,930). If the well bore is fairly shallow, and the noise generated by the drill string drive is or is made to be of fairly high amplitude, such noise could of course, after reflection at the bottom of the string, or at the collar, serve as the carrier which is modulated to transmit the telemetry signals, or control signals of any nature, to top side.

In the preferred case, rotation generated zero order torsional waves in the drill string are modulated at the bottom of the drill string in a manner to effectively transmit upwardly through the string selected torsional wave components representing information signals. These signals may be detected at the surface by any suitable demodulator to recover the transmitted information.

BRIEF DESCRIPTION OF THE DRAWINGS

FIG. 1 illustrates well bore drilling apparatus embodying a drill string communication system according to the invention;

FIG. 1a is a view of a bit of the toothed cone type such as might be used in the system shown largely diagrammatically in FIG. 1;

FIG. 2 is an enlarged detail of the rotary table, kelly and hoist of the drilling apparatus;

FIG. 3 is an enlarged longitudinal section through the drilling kelly illustrating a magnetostrictive transducer embodied in the kelly;

FIG. 4 is a further enlarged section taken on line 4—4 in FIG. 3;

FIG. 5 is an enlarged section taken on line 5—5 in FIG. 4;

FIG. 6 is an enlarged section taken on line 6—6 in FIG. 3;

FIG. 7 is an enlarged section through an inertial modulator embodied in the communication system;

FIG. 8 is a section taken on line 8—8 in FIG. 7;

FIG. 9 is a section taken on line 9—9 in FIG. 7;

FIG. 10 is a diagrammatic illustration of the drill string communication system;

FIGS. 11 and 12 are general and more specific diagrams, respectively, of well bore modulator circuitry of the communication system;

FIG. 13 is a diagram of a topside receiving system;

FIG. 14 is a diagram of the acoustic transmission characteristics of a drill string;

FIG. 15 is a longitudinal section of a somewhat diagrammatically shown turbine bit that may be used in the system as a noise generator, being a view taken on line 15—15 of FIG. 16;

FIG. 16 is a section on line 16—16 of FIG. 15; and

FIG. 17 shows the use, in the system of the invention, of a previously known deflection system to permit slant directional drilling, and which also may be used in the communication system of the present invention as a noise generator.

DESCRIPTION OF THE PREFERRED EMBODIMENTS

Turning now to FIGS. 1–14, there is illustrated a communication system 10 according to the invention for transmitting information through a subsurface pipe 12 from a signal-transmitting station 14 to a signal-receiving station 16 through an intervening length 17 of the pipe which is capable of sustaining torsional or other acoustic oscillations. The communication system includes a drill bit or cutter 64 that, as a consequence of its drilling action, induces in the pipe 12 acoustic waves, preferably torsional; means 20 at the signal-transmitting station 14 for modulating the waves with a modulating signal representing the information to be transmitted and receiving means 24 at the signal-receiving station 16 for demodulating the modulated waves to recover the transmitted information. The almost wholly schematic FIG. 1 indicates conventionally, at 64, any suitable drill bit. What is contemplated, however, as already mentioned, is a toothed rock bit, and this of course would be, preferably, and illustratively, a toothed roller or toothed cone type such as represented diagrammatically at 64a in FIG. 1a. The particular embodiment of the invention selected for illustration represents the primary application of the communication system. In this case, the pipe 12 is a drill string suspended within a well bore 26 from a surface drilling platform 28. The communication system is utilized to transmit signals along the drill string between the transmitting and receiving stations. These transmitted signals may be either control signals for operating devices at the drilling platform, or telemetric signals representing selected drilling parameters to be monitored at the platform.

The drilling platform 28 is conventional and hence need not be described in elaborate detail. Suffice it to say that the platform has a derrick 30 mounted on a floor 32 and supporting a hoist 34. Hoist 34 includes a travelling block 36 supported by a cable 38 and carrying a swivel 40. This swivel provides a rotatable connection beween the travelling block and the drilling kelly 42 at the upper end of the drill string 12. Kelly 42 extends downwardly through a rotary table 44 on the derrick floor 32 and through the well casing 46 and a blow-out preventer 48 sealed to the wall of the well bore as at 49. The upper end of the drill string 12 proper is connected to the lower end of the kelly. The hoist 34 and rotaty table 44 are powered by a draw works 50. A drilling fluid circulation pump 52 delivers drilling fluid or mud under pressure from a mud pit 54 or other fluid reservior to the swivel 40 through a mud hose 56. The mud flows downwardly through the kelly 42 and the drill string 12 and finally returns to the surface though the well bore, about the outside of the drill string, and then through blow-out preventer 48. The mud flows from the blow-out preventer back to the reservoir though a return line 58.

Drill string 12 is composed of individual drill pipe sections 60 of usually uniform length joined end to end by couplings 62 which are commonly referred to as tool joints. In some cases the drill string may contain additional sections, known as drill collars. Each drill string section 60 normally has a length of approximately 30 feet. Drill collar 63 and a drill bit or cutter 64 or 64a are coupled to the lower end of the drill string.

In operation of the illustrated drilling rig, the rotary table 44 is driven in rotation by the draw works 50 to drive the kelly 42 and hence the drill string 12, in its rotary drilling motion. The hoist 34 is operated to support a portion of the drill string weight, such as to maintain the proper drilling pressure on the cutter 64. The mud pump 52 is operated to provide continuous circulation of drilling mud through the well bore to lubricate the cutter and remove debris from the well bore.

The particular acoustic communication system 10 of the invention which has been selected for illustration in FIGS. 1–4 is designed for monitoring selected drilling parameters in the vicinity of the drill bit in order to provide the drilling operator with sufficient information to effectively control the drilling operation. As noted earlier, typical drilling parameters which provide valuable information to the drilling operator are temperature, formation pressure, formation porosity, drill string orientation, and others. In this case, the signal transmitting station 14 is located at the lower end of the drill string 12, and the signal-receiving station 16 is located at the drilling platform 28. Sensors 65 are shown mounted within the drill collar 63 to sense the drilling parameters to be monitored. These sensors are connected to the modulating means 20 and provide signals representing the monitored drilling parameters. The modulating means processes the sensor output signals to provide a modulating or telemetric signal containing information representing all of the monitored drilling parameters and modulates the acoustic waves induced in the drill string 12 by the rotating drill bit 64a with the telemetric signal. The modulated waves travel up the string to the surface signal-receiving station 16 where the waves are demodulated by the receiving means 24 to recover the transmitted drilling parameter information.

In certain of its aspects the invention contemplates the use of any acoustic waves that are incidentally generated or established in the drill string, not by a discrete wave generator device having no other function, but as an incidental but inherent consequence of drilling operations, and are capable of modulation by the telemetric signal to be transmitted and capable of propagation through the drill string 12 with sufficiently small acoustic loss and dispersion over the length of the drill string to provide efficient signal reception at the signal receiving station 16. In this regard, it is significant to recall that torsional acoustic waves are superior to all other acoustic wave forms, such as longitudinal and flexural, for acoustic signal transmission through a drill string, sine torsional waves couple less acoustic energy into the drilling fluid and the wall of the well bore. According to the preferred practice of the invention, the torsional waves used for signal transmission are thoe torsional acoustic waves of zero order that are generated in the drill string as a consequence of the drilling action. Such zero order waves are characterized by pure rotation of each transverse section of the drill string within an advancing wave front about the longitudinal axis of the string. The major advantage of such zero order torsional waves resides in the fact they they are non-dispersive. Non-dispersive wave propagation is desirable, and essential to rapid efficient signal transmission through a drill string, since dispersion smears the transmitted signal along the string and renders difficult the recovery of the signal at the signal receiving station. For a more complete discussion, see our U.S. Pat. No. 3,790,930.

The frequency of the torsional waves is also an important factor in efficient signal transmission through the drill string 12 in that the couplings 62 which join the drill string pipe sections 60 acoustically load the string and the mud about the string attenuates higher frequencies of acoustic oscillation. The jointed string thus tends to pass lower acoustic frequencies with less attenuation than higher frequencies, due to the frequency-dependent attenuation of the mud, while the couplings 62 introduce zeros of transmission as shown in FIG. 14. According to the preferred practice of the invention, the torsional acoustic waves selected for signal transmission, from among those generated by the drilling action, are chosen to effect wave propagation through the drill string in its base band of transmission. This is the band from zero frequency to the first zero of transmission, $f_o$. In this band, the mud produces minimum attenuation of the waves and thus permits maximum signal transmission through the string. However, in its broader scope, the invention contemplates acoustic wave propagation through the drill string in its higher pass bands so long as suitable signal reception is possible at the signal receiving station.

The drill string communication system in FIGS. 1–4 employs a presently preferred crossed-field magnetostrictive transducer 66 for receiving the modulated torsional waves propagating up the drill string. This transducer is embodied in and forms a load bearing part of the kelly 42. It should be noted that by employing a bias field coincident with rather than crossed with the signal field, a transducer for receiving longitudinal acoustic waves results, with the same attributes as just mentioned, and is also considered within the scope of the invention.

The earlier discussed reduction in acoustic transmission losses resulting from utilization, in the present drill string communication system, of torsional acoustic waves, particularly zero order torsional waves within the base band frequency range of the drill string 12, together with the self-supporting construction of the present magnetostrictive transducers permits various types of acoustic wave communication through the drill string. When monitoring drilling parameters, such as those mentioned earlier, the preferred method of communication involves selecting zero order torsional waves generated by the drilling action in the base band of the drill string's transmission characteristic to be modulated at the signal transmitting station 14 with the telemetric signal representing the drilling parameters to be monitored. The modulated waves then travel upwardly through the drill string to the surface signal receiving station 16. A primary advantage of this communication method resides in the fact that a torsional wave generating transducer, along with the large power source to drive it, are not required in the well bore.

The drill string communication system illustrated in FIGS. 1–4 employs this preferred method of acoustic communication. Referring now in greater detail to this communication system, the illustrative means 18 for receiving the modulated torsional acoustic waves travelling in the drill string 12 comprises the aforementioned torsional acoustic wave transducer 66 which is embodied in the drilling kelly 42. Broadly, these may be of any suitable form. The preferred transducer system, however, includes a lower crossed-field magnetostrictive transducer 66 according to the invention, and an upper torque reaction stub 70, as shown in FIG. 3. The transducer and torque reaction stub have tubular bodies 72, 76, respectively, rigidly joined end to end in any convenient way. These tubular boies have a uniform, non-circular, usually square, cross-section matching that of a conventinal drilling kelly and together constitute the drilling kelly 42.

The lower end of the kelly 42, that is, the lower end of transducer body 72, is coupled to the upper end of the drill string 12 by a tool joint 78. Swivel 40 is rotatably coupled to an extension 79 at the upper end of the kelly, that is, to the upper end of the upper reaction stub body 76. As shown in FIGS. 1–4, this swivel has an inverted cup-like housing 80 receiving the upper end of the stub body extension 79. The housing is attached to the extension by a pair of combined radial and thrust bearings 82. A seal ring 84 provides a liquid tight seal between the housing and extension. The kelly 42 is thus restrained against longitudinal movement but is free to rotate relative to the swivel housing 80. At the upper end of the housing is a lifting bail 86 by which the housing and hence the kelly 42 and drill string 12, are suspended from the travelling block 36 of hoist 34.

The mud hose 56 connects to the swivel housing 80 and opens to the interior housing chamber 88 above the seal 84. Extending centrally through the kelly 42 is a mud passage 90 through which drilling mud entering the chamber 88 through the mud hose 56 flows to the central mud passage in the drill string 12.

As noted above, the torsional wave transducer 66 is preferably a crossed-field magnetostrictive transducer. Transducers of this general class are described in our U.S. Pat. No. 3,790,930 And in our divisional Pat. No. 3,906,435. Such a transducer requires an elongated body of magnetostrictive material and means for establishing a magnetic bias field within the body. The bias field may be an axial field whose field lines extend longitudinally through the body or a transverse field whose field lines extend circumferentially through the body. The transducer operates in an acoustic signal receiving mode, since a torsional strain within the trasducer body induces in the body a magnetic field crossed with the bias field — a circumferential induced field in the longitudinal bias field case and a longitudinal induced field in the circumferential bias field case. As this strain-induced signal field varies with the incident acoustic strain, a voltage is induced in the associated signal field conductors, proportional to the rate of strain.

In such a crossed-field magnetostrictive transducer, the fields in the longitudinal and circumferential directions may be established in various ways. For example, the field in the circumferential direction may be established by passing a current longitudinally through the transducer body or through a conductor within the body. The field in the longitudinal direction may be established by passing a current through a coil surrounding the body. Alternatively, either field may be established by constructing the transducer body of a magnetically remanent magnetostrictive material which is permanently magnetized in the proper direction. The field in the longitudinal direction may also be established by permanent magnets along the transducer.

Further details of the magnetostrictive transducer are given in our parent U.S. Pat. No. 3,790,930, all of the subject matter of which is incorporated herein by this reference. Reference has also been made to our divisional U.S. Pat. No. 3,906,434 of which this application is a continuation-in-part. See also our U.S. Pat. No. 3,906,435.

It is significant to note here that in the present drill string communication application the mechanical properties of the transducer body also enter into the selection of the magnetostrictive material for the body. Foremost among these mechanical properties are machinability, tensile strength, effect of tensile stress on the magnetostrictive characteristics, electrical conductivity, and others.

The crossed-field magnetostrictive transducer 66 embodied in the well drilling apparatus of FIGS. 1–4 is designed for remanent operation. To this end the transducer body 72 has a major central portion 72p constructed of a magnetically remanent magnetostrictive material. In this instance the material is biased with a remanent field in the longitudinal direction.

Fixed to and extending the full length of the kelly mud passage 90 is a sleeve 94 of copper or the like which provides an inner signal-field conductor of the transducer. Fixed within channels 96 in the four sides of and extending the full length of the kelly 42 are strips 98 of copper or the like which provide outer signal-field conductors of the transducer. These outer conductors are electrically insulated from the transducer body 72 by electrical insulation 100. The lower ends of the inner and outer conductors 94, 98 are electrically connected at 102. The upper ends of the conductors are electrically connected to the leads of a cable 104 through collector rings 106 surrounding the upper end of the kelly 42 and collector brushes 108 carried by the swivel housing 80. The upper collector ring is assured good electrical contact to the inner conductor by means of copper rivets 107. The lower collector ring is in direct electrical contact with the outer conductors.

As will be explained in more detail presently, the zero order torsional acoustic waves generated in the drill string as a consequence of the drilling action are modulated at the subsurface signal-transmitting station 14 with a telemetric signal representing the drilling parmeters to be monitored. These modulated waves travel upwardly through the drill string 12 to the surface, where they are received by the transducer 66 and then demodulated to recover the transmitted data.

The modulated zero order torsional acoustic waves incident on the transducer 66 induce in the transducer body 72p a fluctuating torsional strain accompanied by a fluctuating circumferential magnetic field, which in turn induces a fluctuating voltage proportional to the strain rate in the transducer signal field conductors 94, 98 and thence at the output of cable 104. Receiver circuitry 152 detects this voltage and demodulates it to recover the telemetered data, in the manner to be explained presently.

Broadly, any acoustic waves capable of propagation through the drill string and capable of modulation by the telemetric signal to be monitored to achieve effective signal transmission from the sub-surface signal transmission station 14 to the surface signal receiving station 16 may be used. Preferably, however, these are torsional acoustic waves.

It will be further recalled, however, that the preferred and most advantageous waves, particularly for great depths, have been discovered to be torsional acoustic waves of zero order and of the proper frequency to effect wave propagation through the drill string 12 in its base band. In this latter regard, attention is directed to FIG. 14. This figure depicts the relationship between a quantity T, representing the relative transmission of torsional acoustic wave propagation through a drill string, and the frequency $f$ of the torsional waves expressed in units of the quantity $f_o$. This latter quantity is the torsional wave frequency at which the transmission quantity T first becomes zero. The frequency quantity $f_o$ is related to the velocity $c$ of torsional wave propagation through the drill string and a distance $d$ (approximately half the physical distance between adjacent drill string couplings 62) by the following equation.

$$f_o = \frac{c}{4d}$$

As indicated in FIG. 14, the base band of torsional wave propagation through the drill string 12 occurs in the region between $f = 0$ and $f = f_o$. From this it will be understood that in the preferred practice of the invention, the torsional acoustic waves generated by the drilling action that are selected for modulation will have frequency components such that if $f$ is the frequency of a component, then $$0 \leq \frac{f}{f_o} \leq 1$$

For a standard drill string composed of 30 foot pipe sections and conventional tool joint couplings 62, $f_o$ is on the order of 160 Hz.

Returning again to the torsional wave transducer 66, the transducer body 72 will be recalled to have a torque reaction stub 70 which provides an acoustic reaction termination at the upper end of the transducer. While this upper reaction stub or termination may conceivably be designed to serve as an absorbing termination, the particular termination shown is assumed to be a reflecting termination.

The theory of reflecting terminations is well understood and hence need not be explained in great detail. Suffice it to say that the correct length of a reflecting termination depends on the nature of the reflections occurring at the upper end of the termination. For example, if the upper end of the termination is open, with no acoustic connection to any structure, the end constitutes a node for torque and an antinode for torsional displacement. In this case, the optimum termination length is an odd number of quarter wave lengths of the acoustic waves to be reflected. On the other hand, if the end of the termination is acoustically rigid, that is, anchored to a very large mass with an acoustic impedance large relative to that of the transducer and termination, the end of the termination is an antiode for torque and a node for torsional displacement. In this case, the optimum termination length is an even number of quarter wave lengths of the acoustic waves to be reflected. For intermediate cases, the termination must have an intermediate length determined by the acoustic conditions at the end of the termination. Obviously, the torque reaction stub or termination 70 represents such an intermediate case and must be dimensioned accordingly.

It will be immediately evident to those versed in the art that a variety of acoustic wave modulating means 20 may be employed in the present drill string communication system. See our parent U.S. Pat. No. 3,790,930, and our copending divisional U.S. Pat. No. 3,906,434, of which this application is a continuation-in-part. See also our co-pending U.S. Pat. No. 3,900,827, which is a division of our Pat. No. 3,790,930. FIGS. 7–9 illustrate an inertial modulator for the system, others being disclosed in our U.S. Pat. No. 3,790,930. This inertial modulator has a central tube or pipe 110. Surrounding the upper end of the modulator pipe 110 is a relatively massive inertial cylinder 118. Inertial cylinder 118 is rotatably supported on and restrained against movement along the pipe 110 by combined radial and thrust bearings 120. Seals 122 seal the ends of cylinder to the pipe. Between its ends, the inertial cylinder 118 is internally enlarged to define an annular chamber 124 between the cylinder and the pipe 110. This chamber is filled with a magnetic fluid 126, such as a mixture of oil and powdered iron. Contained in four uniformly spaced longitudinal slots 128 in the portion of the modulator pipe 110 within the chamber 124 is a drive coil 130. As shown best in FIG. 8, the conductors of the drive coil extend lengthwise of the slots 128. Moreover, as indicated by the + and − signs in the figure, the drive coil is wound in such a way that when a voltage is impressed across the coil, current flows in one direction through the conductors in two diametrically opposed slots and in the opposite direction through the conductors in the remaining two diametrically opposed slots.

It will now be understood that the modulator structure described thus far constitutes, in effect, an electromagnetic clutch. Thus, when the drive coil 130 is de-energized, the pipe 110 and inertial cylinder 118 are capable of free relative rotation. Energizing of the drive coil produces a magnetic coupling between the pipe and cylinder which resists relative rotation of the pipe and cylinder with a torque proportional to the current flow through the drive coil.

Surrounding and fixed to the modulator pipe 110 below the inertial cylinder 118 is an annular circuit housing 132 containing the driving circuit 134 for the modulator drive coil 130. The drive coil is connected to the output of the circuit through leads 135. Modulator driving circuit 134 will be described shortly.

In this regard, it will be observed that the modulator pipe transmits drilling torque to the drilling cutter 64 (or 64a) and supports the weight of the drill string below and thus must be designed to have sufficient torsional and tensile strength to withstand these loads. Extending through this component is a mud passage which forms a continuation of the drill string mud passage.

As noted earlier, it is desirable or necessary during a drilling operation to monitor several different drilling parameters in the vicinity of the drilling cutter 64, or to be more particular, a toothed roller bit such as the conventional toothed cone bit 64a. Some of these parameters were listed in the earlier description and thus need not be repeated here. Suffice it to say that the sensors 65 are selected and arranged within the drill collar 63 to be responsive to the particular drilling parameters to be monitored. In this regard, it is significant to note that sensors for this purpose are well-known and available on the commercial market. Accordingly, it is unnecessary to describe the sensors except to say each sensor produces an electrical output representing its respective drilling parameters. The several sensors 65 are electrically connected through leads 146 to the input of the modulator driving circuit 134.

The modulator driving circuit driving circuit 134 will be explained presently. Suffice it to say here that the circuit effectively combines the several outputs from the drilling parameter sensors 65 and produces a telemetric signal containing information representing all the drilling parameters. This telemetric signal is processed to produce a corresponding modulator driving signal which is applied through leads 135 to the modulator drive coil 130 and produces a corresponding fluctuating magnetic coupling between the inner pipe 110 and outer inertial cylinder 118 of the modulator 20. As a consequence, the torsional acoustic waves generated by the drilling action that are propagating upwardly through the modulator pipe 110 are variously partially transmitted or partially reflected according to the state of the fluctuating magnetic coupling between the inner pipe 110 and the outer inertial cylinder 118 of the modulator 20, and thus are modulated to contain information representing the drilling parameters being monitored. Accordingly, an increase in the magnitude of the modulator driving signal produces a corresponding increase in the magnetic coupling between the modulator pipe and inertial cylinder, thereby increasing the effective torsional mass of the pipe and retarding the phase as well as altering the amplitude of the waves then travelling through the modulator. Similarly, a decrease in the magnitude of the driving signal produces a corresponding reduction in the magnetic coupling between the modulator pipe and inertial cylinder, thereby reducing the effective torsional mass or movement of the pipe and advancing the phase as well as altering the amplitude of the waves then travelling through the modulator.

The modulated waves travel upwardly through the drill string 12 to the surface signal receiving station 16. These modulated waves produce a corresponding fluctuating torsional strain in the magnetostrictive body 72 of the transducer 66, thereby inducing in the transducer field conductors 94, 98 a fluctuating voltage containing information representing the transmitted telemetric signal. As explained below, the voltage signal from the transducer is processed by a receiving circuit at the surface to recover the transmitted information representing the drilling parameters being monitored.

Turning now to FIG. 11 there is illustrated the general arrangement of one illustrative modulator driving circuit 134 which is contained in the modulator circuit housing 132. As noted, this circuit converts the outputs from the drilling parameter sensors 65 to a coded driving signal for the modulator 20. This driving circuit includes a power source (not shown), such as a battery, an encoder 148 and modulator driving circuitry 150. The encoder is connected to the drilling parameter sensors 65 to receive the several sensor outputs and processes these outputs to produce a telemetric signal containing information representing all of the sensor outputs. This telemetric signal is applied to the driving circuit 150 which processes the signal in such a way as to produce a modulator driving signal for the modulator drive coil 130.

The driving circuit 134 may utilize various signal processing techniques for converting the outputs from the drilling parameter sensors 65 to a suitable driving signal for the inertial modulator 20.

Suffice it to say that FIG. 12 shows a binary phase coded system wherein the encoder 148 is a binary digital encoder for converting the analog outputs from the sensors 65 to a binary digital signal containing information representing the outputs of all the sensors. The modulator driving circuit 150 is a power amplifier which amplifies this binary digital signal to the proper strength for driving the modulator 20.

Considering now the system of FIG. 10, there is connected to the topside transducer 66 a receiving electronic system 152, comprising, for example, amplifier means 154, detector means 156, digital decoder means 158, and display or recorder means 160.

The operation of transducer 66 and receiving system 152 will be immediately evident to those versed in the art. Thus, at the subsurface signal transmitting station 14, the zero order torsional waves generated by the drilling action are modulated, as explained previously, to contain the information representing the telemetric signal to be transmitted and travel upwardly through drill string 12 to transducer 66. As was explained earlier, these modulated waves produce a fluctuating torsional strain in the transducer body 72 and thereby a corresponding fluctuating voltage signal in the transducer field conductors 94, 98 and at the output of cable 104, to which receiving system 152 is connected. The amplifier means 154 amplifies the voltage fluctuations at the output of cable 104 to a level suitable for processing by detector means 156, which is sensitive to those components of the acoustic noise generated by the drilling action that were selected for the data transmission. The digital decoder means 158 converts the output of the detector to a series of digits that represent the telemetric data transmitted and this data is recorded or displayed as drilling parameter information by the display or recorder means 160.

FIGS. 15 and 16 show the lower end portion of an alternative system within the broad scope of the invention, making use of a turbine-driven, "toothed" diamond cutter wheel which, per se, is known in the art. Reference is made to Novel Drilling Techniques, William C. Maurer, Pergamon Press, 1968. The system may be the same as that of FIGS. 1–14, excepting for the portion shown largely diagrammatically in these FIGS. 15 and 16. The lower end of the drill string is terminated, below the drill collar, such as collar 63 of FIG. 1, if such a collar is used, by a special drill tool 200, which is attached to the drill string by suitable means, such as a double-pin sub, or a tool joint, (not shown) and a special coupling section 200a, only the lower portion of which appears in FIGS. 15 and 16. If drill collars are not used, the coupling section 200a will be understood as coupled in any fashion to the lower end of the lowermost drill pipe length of the string. The drill cutter assembly 201 is attached to the special coupling section 200a by a threaded portion 202 which has depending bifurcations 203. A cross shaft between the latter rotatably mounts a diamond cutter wheel 204 whose sides have turbine buckets 205. The drilling mud passage 206 of this tool is turned to one side, at the bottom, to form a nozzle, as shown, directed tangentially to the wheel 204 and normally against the buckets 205 so as to drive them and the turbine wheel in high velocity rotation in drilling engagement with the hole bottom. At the same time, the drill string may be rotated by the rotary table above. Sloping arcuate shoulders 208 at the lower ends of the bifurcations bear diamond cutting elements, not visible, to ream the hole to pass the full diameter of the bit, if the wheel 204 cuts at too small a diameter.

The diamond studded cutter wheel 204, as well as the diamond studded reamers constituted by the shouldrs 208, generate acoustic noise, which propagates up the drill string, as acoustic waves, to be modulated at the transmitting station by the modulating signal, and thence propagated up the string, through the substance thereof to the receiving station above, to be recovered at the latter, and translated into information as before.

In an alternative operation of the system of FIGS. 15 and 16, it may be that drilling, in the narrow sense of drilling ahead, may have been temporarily stopped, while an operation covered within the broad meaning of well drilling operations is to be carried out. That is to say, it may often be that, for example, some condition in the bottom of the well is to be checked while drilling rotation is stopped. In this case, with the rotation of the drill pipe arrested, the turbine wheel still may be driven by the mud stream, and acoustic waves will be generated by the interaction of the mud stream with the buckets 205 of turbine wheel 204. Thus, driving the turbine wheel by pumping the circulating mud fluid through it, even with the turbine wheel disengaged from the bore hole bottom, still self-generates acoustic waves which couple to the drill string, and are propagated up the drill string to be modulated by the information signal at the transmitting station, and thereafter received and recovered topside, as in earlier described versions of the system. Thus the described system can utilize either an operation of the drilling system in which the drill string rotates, or an operation of the drilling system in which the drill string does not rotate.

Still another form and application of the invention is shown, somewhat deagrammatically, in FIG. 17, in which is illustrated just the lower end portion of the drill pipe string, part way up through the collar or collars, and in which, above this lower end portion, the string may be as in FIG. 1. In FIG. 17, the lower end portion of collar 63 is shown, the string above being broken away. The purpose here is to illustrate still another means by which acoustic waves can be generated as an inherent consequence of drilling operations, using certain slant drilling equipment that is now widely known in the art. Thus the system shows in FIG. 17, below the drill collar or collars 63 of FIG. 1, certain patented, widely known slant drilling equipment manufactured by Dyna-Drill Co., a Division of Smith International, Inc. The Dyna-Drill equipment is shown and described in handbooks and catalogues which have been distributed to the public.

Referring to FIG. 1, the collars 63, instead of being coupled directly to the bit, as there shown, are here, in FIG. 17, coupled at their lower end to a bent deflecting sub 322, which is coupled at its lower end to a housing pipe 324 containing a turbine T (not shown because of its conventional nature). The rotor of turbine T (also not shown) is connected at its bottom, via a bearing and drive shaft assembly (also not shown), to a rotating bit sub 326 which emerges from housing 324. A toothed tri-cone bit 328 is connected to sub 326 by a conventional pin and box assembly (also not shown). In practice, any other bit found suitable can of course be substituted for the specific tri-cone bit.

In slant drilling, the drill string 12 is held stationary by the rotary table above, and the turbine rotor is driven by pumping the circulating mud fluid down the drill string through the turbine. The bit bores at a diameter somewhat greater than that of the housing 324, collars 63, etc., and because of the bent deflecting sub 322, bores in a direction somewhat deflected from the axis of the string 12.

The turbine driven bit grinding on the rock can thus be the source of the noise; or, with the bit off the bottom, any rotational unbalancing of the turbine rotor, the sub, or the bit, etc. can be the source of the necessary noise generating activity. It will be plain that this version of the invention is operative as a noise generator, either while drilling ahead, or with the bit lifted to suspend drilling.

The turbine herein referred to as an example, such as manufactured by Dyna-Drill Co., is a Moyno pump in reverse, i.e., the circulation fluid drives the rotor in rotation on an axis parallel to the axis of the surrounding housing. This equipment is well known in the art and its details need not be illustrated or described herein. However, there are appended to and transmitted herewith, and incorporated herein by this reference, a DYNA-DRILL HANDBOOK (2d Ed.) and a DYNA-DRILL 1974–1975 catalogue, showing and describing such details.

Those versed in the art will understand at this point that the drill string in the various disclosed inventive embodiments constitutes an acoustic transmission line and that the various elements in the drill string, such as tool joints, acoustic wave transducer and modulator, and the like, constitute perturbations in the string at which occur a complex action of partial reflection and partial transmission of the acoustic waves travelling through the drill string. However, it can be demonstrated by well-known mathematical transmission line analysis techniques that during operation of the present well bore communication system, the several acoustic wave reflections and transmissions result in transmission from the signal transmitting station to the signal receiving station of net or resultant modulated acoustic waves containing information representing the signal impressed on the modulator or transducer at the transmitting station and hence also representing the drilling parameter or other information to be transmitted. These net or resultant modulated acoustic waves are demodulated at the signal receiving station in the manner heretofore explained to recover the transmitted information.

The immediate parent U.S. Pat. No. 3,906,434, of which this application is a continuation-in-part, was entitled THREE TERMINAL TELEMETERING SYSTEM FOR OIL WELLS. One of these terminals is at the point at which acoustic waves from the acoustic wave source are established in the drill string for propagation therealong. The second terminal is the transmitting station where these acoustic waves in the drill string are modulated by information signals from the sensor or sensors, and the third terminal is an output terminal at which the modulated acoustic waves are received and, by demodulation or detection, the sensor information recovered. The present system is broadly of the same class. In the language of claim 1, for example, the step of utilizing acoustic waves already present in the drill string, as an inherent consequence of conducting drilling operations, expressly implies a first "terminal" at which these waves are produced. The second terminal is then at the transmitting station, where the acoustic waves so produced in the drill string are modulated by the sensor information signals to contain the information to be transmitted along the drill string. Finally, the third or output terminal is located at the receiving station, where the information borne by the modulated acoustic waves is recovered.

From the foregoing description, it will be understood that various changes in the detailed construction and arrangement of the parts constituting the three-terminal telemetering system of the present invention utilizing self-generated noise as the source of acoustic waves may occur to those skilled in the art without departing from the spirit and scope of the present invention. Accordingly, it is to be understood that the foregoing description is considered to be illustrative of, rather than limitative upon, the invention as defined by the appended claims.

What is claimed is:

1. In a wall drilling system, a method of communicating information between signal-transmitting and signal-receiving stations spaced along a drill string having an intervening length between said stations capable of sustaining acoustic waves within the substance of the string, comprising the steps of:
   utilizing, for the communication of said information, acoustic waves that are already present in the drill string solely as an inherent consequence of conducting drilling operations in said system and which can propagate along said drill string, within the substance thereof, at least between said transmitting and receiving stations;
   generating a modulating signal containing the information to be transmitted;
   modulating said acoustic waves in said drill string at said transmitting station by said modulating signal according to a predetermined modulating mode to contain the information to be transmitted, all in such manner that resulting modulated acoustic waves then travel from said transmitting station to said receiving station through the substance of the drill string; and
   receiving said modulated waves at said receiving station to recover said signal and its contained information.

2. The method of claim 1 wherein:
   at least part of said drill string is suspended within a well bore from a drilling platform.

3. A method of communicating information according to claim 1, wherein:
   said drill string has a drill bit at its lower end, and said acoustic waves utilized for said communication of information are already present in said drill string as an inherent consequence of driving said drill string in its drilling motion while said drill bit is in contact with the bottom of said bore, thereby creating said acoustic waves in said drill string by virtue of the stresses induced in said string by the drilling action of said bit, said waves travelling upwardly through said drill string from said bit to said transmitting station.

4. The method of claim 1 wherein: said acoustic waves utilized for said communication of information are zero order torsional waves.

5. The method of claim 3 wherein:
   said transmitting station is located within said well bore and said receiving station is above said transmitting station.

6. The method of claim 5, including the step of locating said transmitting station in the vicinity of the drill bit.

7. The method according to claim 1, wherein said acoustic waves utilized for said communication of information are already present in said drill string as an inherent consequence of driving said drill string in its drilling motion by machinery which inherently produces acoustic waves in the drill string.

8. The method of claim 1, wherein said drilling system includes a fluid driven turbine at the lower portion of the drill string, and drilling means at the lower end of the drill string driven by said turbine, comprising:
   driving said turbine by circulation fluid conveyed to it down the drill string, and thereby producing in said drill string said acoustic waves to be modulated.

9. The method of claim 8, wherein the turbine is suspended from the drill string and arranged to turn on a transverse axis when said turbine is driven by said circulation fluid, and said drilling means is turned on said axis by said turbine.

10. The method of claim 8, wherein the turbine is within the lower portion of the drill string, and includes a circulation fluid-driven rotor turning on a substantially longitudinal axis of the drill string, and said drilling means is a bit driven by said turbine and turning on said axis.

11. In a well drilling system, a communication system for communicating information between signal-transmitting and signal-receiving stations spaced along a drill string having an intervening length between said stations capable of sustaining acoustic waves within the substance of the string, comprising:
   means for utilizing, for the communication of said information, acoustic waves that are already present in the drill string solely as an inherent consequence of conducting drilling operations in said well drilling system and which can propagate along said drill string, within the substance thereof, at least between said transmitting and receiving stations, said means including;
   means for generating a modulating signal containing the information to be transmitted;
   means for modulating said acoustic waves in said drill string at said transmitting station by said modulating signal according to a predetermined modulating mode to contain the information to be transmitted, all in such manner that resulting modulated acoustic waves travel from said transmitting station to said receiving station through the substance of the drill string; and
   means for receiving said modulated waves at said receiving station to recover said signal and its contained information.

12. The communication system according to claim 11 wherein:
   at least part of said drill string is suspended within a well bore from a drilling platform.

13. A system to claim 11, wherein:
   said drill string has a drill bit at its lower end, and said acoustic waves utilized for communicating information by said means are present as an inherent consequence of movement of said drill bit in engagement with the bottom of said bore as said drill string is driven in its drilling motion, all in a manner to create in said drill string acoustic waves due to the stresses induced in said string by the drilling action of said bit, said waves travelling upwardly through said drill string to said transmitting station.

14. The system of claim 11, wherein:
   said acoustic waves utilized for communicating information by said means are zero order torsional acoustic waves.

15. The system of claim 12, wherein:
   said transmitting station is within said well bore and said receiving station is above said transmitting station.

16. The system of claim 15, wherein:
   said transmitting station is in the vicinity of the drill bit.

17. The well system according to claim 11, including means for driving said drill string in its drilling motion, including machinery that is an inherent component of said driving means and which incidentally produces said acoustic waves in the drill string.

18. The well drilling system according to claim 11, including a fluid-driven turbine at the lower portion of the drill string,
   drilling means at the lower end of the drill string driven by said turbine, said drilling means operating when rotated to produce in the drill string said acoustic waves to be modulated.

19. The system according to claim 18, wherein the turbine is suspended from the drill string and arranged to turn on an axis transverse of said string and said drilling means is turned on said axes by said turbine when said turbine is driven by said circulation fluid.

20. The system according to claim 18, wherein:
   said turbine is within the lower portion of the drill string, and includes a fluid-driven rotor turning on a substantially longitudinal axis of the drill string, and said drilling means is a bit driven by said turbine and turning on a substantially longitudinal axis of the drill string.

* * * * *